United States Patent Office 3,790,529
Patented Feb. 5, 1974

3,790,529
PROCESS FOR PRODUCING CATIONIC WATER SOLUBLE POLYMER BY REACTING FORMALDEHYDE, AMINE, A POLYMER OF ACRYLAMIDE OR METHACRYLAMIDE AND PRECIPITATING SAID POLYMER WITH A WATER SOLUBLE SALT OF A POLYBASIC ACID
Kinji Fujimura, Tokyo, and Katsutoshi Tanaka, Chigasaki, Japan, assignors to Kabushiki Kaisha Kyoritsu Yuki Kogyo Kenkyusho, Tokyo, Japan
No Drawing Filed Oct. 5, 1971, Ser. No. 186,794
Int. Cl. C08g 9/04
U.S. Cl. 260—72 R         8 Claims

ABSTRACT OF THE DISCLOSURE

Formaldehyde and amine are caused to react with an aqueous solution of a water soluble polymer which is a homopolymer of acrylamide or methacrylamide, a copolymer of them, and a copolymer of acrylamide or methacrylamide with a copolymerizable monomer with them and the polymer has more than 50 mol percent of acid amide group, and more than 5 mol percent of the acid amide group is subjected to aminomethylation, thereby to obtain a cation modified polymer aqueous solution.

A water soluble salt such as a normal salt prepared from a metal such as K, Na, Li, or Mg and a dibasic acid is added to the cation modified polymer aqueous solution to separate a polymer. The resulting polymer is subjected to dehydration and drying at a temperature of below 80° C. thereby to prepare a cationic water soluble polymer.

BACKGROUND OF THE INVENTION

This invention relates to a process for producing acrylamide polymers in a solid-form through Mannich reaction.

A Mannich polyacrylamide prepared by causing an acrylamide polymers such as polyacrylamide to react with formaldehyde and amine, and subjecting the acid amide group in the resulting polymer to aminomethylation through so-called Mannich reaction is very useful for a cationic flocculant and paper strengthening agent etc. Heretofore, such acrylamide polymers obtained through Mannich reaction as mentioned above (hereinafter referred to simply as "Mannich acrylamide polymers") are produced in such a manner that the polymerization of acrylamide monomers and Mannich reaction thereof are carried out in an aqueous solution and as a result, the resulting product is obtained in the form of aqueous solution. In this process, however, since a viscosity of the polyacrylamide is high, the treatment of a polymer solution having a high concentration becomes impossible and generally, the resulting product is an aqueous solution having a concentration of about 5–10%, accordingly, the transportation and handling thereof are inconvenient.

Therefore, a process such that a powdery polyacrylamide is produced by a process of reversed phase emulsion polymerization or suspension polymerization, the resulting polyacrylamide is caused to suspend into an organic solvent being immiscible with water, thus obtained suspension is subjected to Mannich reaction in the presence of a small amount of water, and succeedingly, the water in the system is removed by azeotropic distillation or by the use of a dehydrating agent thereby to obtain a powdery product is proposed as a second process.

In this process, however, there are disadvantages such that in the case even when equivalent formaldehyde and amine are caused to react with the acid amide group of the polyacrylamide, only about 10% of the acid amide group is aminomethylated and functions as a cationic flocculant are insufficient and further that a small amount of the insoluble portion of the product is produced in the case when the product is dissolved into water. Moreover, in this case, since a large quantity of an organic solvent is required, it is disadvantageous from economical and operational viewpoints.

In order to eliminate these disadvantages of a conventional process, we have variously studied and developed and we have noticed that in the former (first) aqueous solution process, Mannich reaction can be comparatively easily carried out except for the problems relating to the handling or transportation of the product, a suitable degree of Mannich reaction can be obtained, and the properties of the product as a flocculant are excellent. Accordingly, the concentration and dehydration of the Mannich polyacrylamide aqueous solution prepared by the aqueous solution process have been tried in order to make the handling and transportation of the aqueous solution easier.

First of all, it was tried that the concentration of the polymer was elevated to more than 10% and Mannich reaction was carried out. However, since the polymer aqueous solution became a paste being very viscous, it became very difficult to carry out the Mannich reaction by uniformly blending formaldehyde and amine. Furthermore, even if this difficulty is dissolved mechanically, cross linking reaction of the polymer causes after a comparatively short period of the storage thereof, and as a result, a gel-form substance being insoluble in water is produced.

On the other hand, in the case when the Mannich polyacrylamide aqueous solution prepared through the Mannich reaction in an aqueous solution of 5–10% of the polymer concentration is dried, the gelation thereof instantly occurs at a high temperature, or even in low temperature vacuum drying, the gelation occurs in accordance with the elevation of the concentration of the solution, and accordingly, it was impossible to obtain a solid Mannich polyacrylamide while maintaining its water solubility.

It is considered that the cause of the gelation is due to methylene bond cross linking through the reaction as indicated hereinbelow.

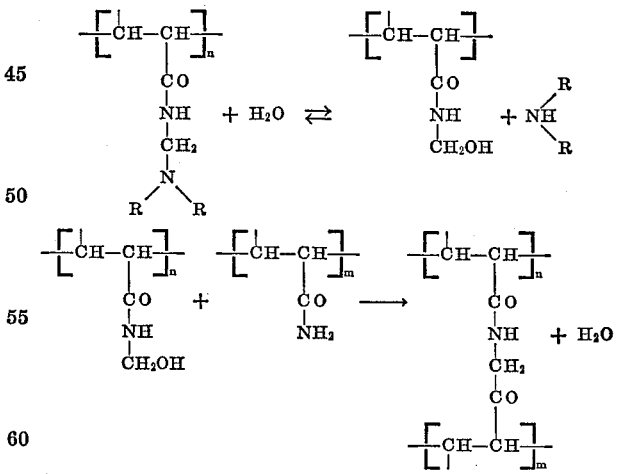

Furthermore, it is possible to produce a solid product in the case when a Mannich polyacrylamide aqueous solution having 5–10% of the polymer concentration is treated with a water absorptive solvent such as acetonitrile, acetone, dioxane, and tetrahydrofuran. In this case, however, since the quantity of the polymer is very small with respect to the water existing in the system, a large quantity of the solvent is required. Accordingly, a very expensive cost is necessary for recovering the solvent in the above-mentioned process so that it cannot be adopted for an industrial process for producing a water soluble polymer.

SUMMARY OF THE INVENTION

It is an object of the present invention to eliminate the above-mentioned disadvantages and to prepare acrylamide polymers which can be easily handled and having high characteristic features as a cationic flocculant.

As a result of our studies relating to the instant problems, we have discovered that the above object and other objects of the invention can be achieved by utilizing our finding that by subjecting an aqueous solution of Mannich acrylamide polymers prepared through the Mannich reaction in the aqueous solution to dehydration by employing a water soluble salt.

That is, according to the present invention, there is provided a process for producing cationic water soluble polymers which comprises the steps of causing formaldehyde and amine to react with an aqueous solution of a water soluble polymer to aminomethylate 5 or more mol percent of the acid amide group in said polymer thereby to obtain a cation modified polymer aqueous solution, said water soluble polymer having 50 or more mol percent of acid amide group and being a member selected from the group consisting of homopolymers of acrylamide or methacrylamide, copolymers of them, and copolymers of acrylamide or methacrylamide with copolymerizable monomers with them, adding a water soluble salt to said cation modified polymer aqueous solution to separate an objective polymer, said water soluble salt being selected from the group consisting of normal salts prepared from a polybasic acid with metals such as potassium, sodium, lithium, and magnesium, monohydrogen salts prepared from a tribasic acid with said metals, normal salts prepared from a mineral acid of polybasic acid with ammonia, and monohydrogen salts prepared from a mineral acid of tribasic acid with ammonia, taking out said objective polymer from the aqueous solution, and then, subjecting said polymer to dehydration and drying at a temperature of 80° C. or less.

The nature, principle, details, and utility of the invention will be more clearly apparent from the following detailed description beginning with general considerations and concluding with specific examples of practice constituting preferred embodiments of the invention and the appended claims.

DETAILED DESCRIPTION

For the acrylamide polymers employed in the process of the present invention, there are homopolymers of acrylamide or methacrylamide, copolymers of them, and copolymers of acrylamide or methacrylamide with copolymerizable monomers therewith, for example, acrylic acid, acrylates, acrylic esters, methacrylic acid, methacrylates, methacrylic esters, N-vinylpyrrolidone, acrylonitrile, methacrylonitrile, vinyl acetate, styrene, diethylaminoethylene methacrylate, N-vinylpyridine or the like, and each of said polymers is water soluble and contains at least 50 mol percent of a monomer component having amide group. Further it is desirable that the polymer has a degree of polymerization of more than 1000.

In the present invention, processes for producing the acrylamide polymers are not particularly specified, but the polymers produced by well known various processes such as aqueous solution polymerization, suspension polymerization, and the like may be employed. However, since the acrylamide polymer is subjected to aminomethylation in the aqueous solution in the process of the present invention, it is advantageous that when the acrylamide polymer is produced through aqueous solution polymerization, succeedingly, Mannich reaction can be carried out in the same system.

The aminoethylation of the polymer is carried out by such a manner that formaldehyde and amine are caused to react with the polymer aqueous solution in accordance with an ordinary process through the Mannich reaction. The reaction condition is not particularly limited, the treatment is easy in the case where a concentration of the polymer in the aqueous solution is adjusted to 5–10% by weight of the solution. Furthermore, for the amine employed in this process, any amine usually employed for such kinds of uses, for example, primary or secondary amines having alkanol or alkyl containing 1–3 carbon atoms may be adopted.

In the present invention, since the cationic water soluble polymer is served for uses such as flocculant and the like, it is necessary to aminomethylate at least 5% of the acid amide in the polymer.

In the process of the present invention, a Mannich polymer is dehydrated and separated by adding a water soluble salt to the resulting Mannich acrylamide polymer aqueous solution mentioned above.

As the salts employed for the present invention, there are normal salts prepared from a dibasic acid with metals such as potassium, sodium, lithium, and magnesium, normal salts and monohydrogen salts prepared from a tribasic acid with the metals such as potassium, sodium, lithium, and magnesium, normal salts prepared from a dibasic mineral acid with ammonia, and normal salts and monohydrogen salts prepared from a tribasic mineral acid with ammonia. These salts are water soluble and the preferable salts in them have a solubility of at least 15 g. (of a salt) with respect to 100 g. of water at a temperature of 20° C., for example, there are carbonates, sulfates, sulfites, silicates, phosphates, methaphosphates, oxalates, citrates, or the like salts of potassium, sodium, lithium, and magnesium and the salts prepared from ammonia with polybasic mineral acids such as sulfuric acid and phosphoric acid. More specifically, the salts such as $K_2CO_3$, $Na_2CO_3$, $K_2SO_4$, $Na_2SO_4$, $(NH_4)_2SO_4$, $MgSO_4$, $Na_2SO_3$, $K_2SO_3$, $Na_2S_2O_3$, $Na_2SiO_3$, $K_2HPO_4$, $Na_2HPO_4$,

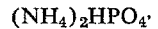

$(NH_4)_2HPO_4$, $K_3PO_4$, $Na_3PO_4$, sodium metaphosphate, potassium oxalate, and sodium citrate are advantageously employed for the process of the present invention.

These salts may be directly added to the Mannich acrylamide polymer aqueous solution in their soild forms or in the forms of perfectly or substantially saturated high concentrated aqueous solutions.

An amount added of each salt differs in accordance with a kind of salt to be employed in the process of this invention, but it is preferable to add a salt in an amount such that a water content of the polymer to be separated and deposited becomes 40–60%, and usually, at least 10% by weight of a salt is added to the polymer aqueous solution.

It is a remarkable feature of the process of the present invention that the advantageous effects thereof cannot be achieved in the case even where either a salt having a very high solubility with respect to water or a salt constituted by a mono-valent anion such as $CaCl_2$, $NaNO_3$, and $KNO_3$ etc. is employed.

Although the functional mechanism of the separation of a polymer by adding the salt in the present invention is not clear, it is assumed tentatively as described hereinbelow.

That is to say, the Mannich polymer dissociates in the aqueous solution to have cationic charge, so that anion of the salts being added to the aqueous solution is adsorbed with the cationic polymer due to the electrostatic force. In the case where poly-valent anion exists, the adsorption results the shrinkage of the high polymer. Furthermore, a strong hydrating force of the salts added destroys the hydrated layer of the macromolecular polymer to divest the water whereby the water is gradually fixed around the ions of the salts as hydration water, and as a result, it is supposed that the polymer is separated in accordance with the increase of the amount added of the salt.

From thus separated polymer, the water is removed by a physical means such as filtration by centrifugation, press, or the like, whereby the water content of the polymer is adjusted to 40–60% by weight of the total amount, and further, the polymer is subjected to dehydration and drying thereby to obtain the solid Mannich acrylamide polymer having about 10° by weight of the water content. Thus obtained solid polymer is stable and does not lose the water solubility even after a long period of storage thereof. Furthermore, in the case where this Mannich solid polymer is pulverized, a powdered product having a suitable particle size can be obtained.

In the above-mentioned dehydration and drying, various means such as vacuum heating and drying, through-flow heating and drying, freeze-drying, or azeotropic distillation under reduced pressure in the presence of an amine having a high boiling point such as diethanol amine, or methylaminoethanol, and a treatment with a water absorbent solvent such as acetone, dioxane, or tetrahydrofuran are adopted. In this case, however, even when any means in those mentioned above is adopted, since a water insoluble portion being partially gelled is formed at a high temperature, it is required that the above described dehydration and drying treatments are carried out at a temperature of 80° C. or less, preferably, 50° C. or less.

In a convenional process, an acrylamide polymer aqueous solution gels easily by heating at a temperature of even below 80° C. for a short period and as a result, drying of the polymer aqueous solution has been difficult.

On the other hand, the gelation of the acrylamide polymer aqueous solution is hard to occur at a temperature of 80° C. or less in the process of the present invention. This phenomenon is considered to be probably due to the result of which the gel reaction is suppressed by the influence of poly-valent anion of the added salt.

The solid Mannich acrylamide polymer prepared by the process of the invention of this application is used as the product in which the added salt is partially included as it is. In the case where the product is dissolved into a solvent to use as a flocculant, or a paper strengthening agent, improving agent of filler retention, and freeness improving agent in paper making, or a soil conditioner and the like, there causes no interference due to the residual salts relating to the effects obtained from the above-mentioned various agents.

The preferred embodiments of the present invention will be specifically described by showing examples hereinbelow, but it is to be noted that the present invention is not limited to the following examples unless departing from the subject matter of the invention.

EXAMPLE 1

(a) Process for preparing polyacrylamide aqueous solution 1 kg. of acrylamide was dissolved into 9 kg. of demineralized water. Nitrogen was caused to flow through the resulting solution for 15 minutes in order to remove dissolved oxygen in the solution and during this through-flow treatment, the temperature of the solution was elevated to 50° C. To thus treated solution, 20 g. of isopropyl alcohol as a chain transferring agent, and 1 g. of ammonium persulfate and 0.4 g. of sodium hydrogensulfite as polymerization initiators were added, respectively, stirred, and dissolved. As a result, after 2–3 minutes, the polymerization initiated and after 4 hours, a polyacrylamide aqueous solution having an average molecular weight of 850,000 was obtained and the concentration of the polymer was 10 wt. percent.

(b) Mannich reaction 1 kg. of 10% by weight of the aqueous solution of the polyacrylamide prepared by the process (a) was charged into a kneading machine provided with a jacket having a volume of 2 litres. Further, 400 g. of water and a mixture consisting of 114 g. of 37% formaldehyde and 221 g. of 40% dimethylamine aqueous solution which were previously mixed and cooled were added to the polyacrylamide aqueous solution and were agitated. Thus obtained mixture was subjected to reaction for 4 hours while maintaining a temperature at 35°–40° C. by causing to flow a warmed water through the jacket.

As a result of colloidal titration of the resulting Mannich polyacrylamide with polyvinyl potassium sulfate by employing Toluidine Blue as an indicator, 82% of amide residual group of the polyacrylamide was aminomethylated.

(c) Separation of polymer 250 g. of powdery potassium carbonate was added to the Mannich polyacrylamide aqueous solution obtained through the reaction (b), and were mixed and stirred thereby to separate the polymer. The resulting polymer was taken out and pressed by an oil press under a pressure of 5 kg./cm.$^2$ for 3 minutes. As a result, a solid polymer having a water content of 48% was obtained.

(d) Drying

The solid polymer obtained by the treatment (c) was subjected to through-flow drying at a temperature of 50° C. for 8 hours. As a result, a solid Mannich polyacrylamide containing 9.0% of water and 8% of potassium carbonate was produced.

In the case when the resulting solid Mannich polyacrylamide was pulverized by a powdering machine, the Mannich polyacrylamide in a powdered form was easily obtained. Thus obtained powder dissolved perfectly into water and no insoluble substance was contained therein. Furthermore, there were no differences between the powdery polymer and the polymer prior to the dehydration and drying in their flocculating effects as shown in the reference example described hereunder.

EXAMPLE 2

1 kg. of 10% by weight of the polyacrylamide aqueous solution prepared by the process (a) of Example 1 was subjected to Mannich reaction in the same condition as in the reaction (b). Succeedingly, 200 g. of anhydrous sodium sulfate was added to the Mannich polymer and were mixed and stirred thereby to separate the polymer. Thus separated polymer was taken out and pressed by an oil press under a pressure of 5 kg./cm.$^2$ for 3 minutes, whereby a solid polymer having a water content of 55% was obtained. This solid polymer was further heated at a temperature of 45° C. under a reduced pressure of 30 mm. Hg for 15 hours thereby to obtain a solid Mannich polyacrylamide having a water content of 0.5%. The pulverized Mannich polyacrylamide dissolved perfectly in water.

EXAMPLE 3

1 kg. of 10% by weight of the polyacrylamide aqueous solution prepared by the process (a) of Example 1 was subjected to aminomethylation through the same reaction as that (b) of Example 1. Then, to the reaction product, a saturated aqueous solution prepared by dissolving 238 g. of dipotassium hydrogen-phosphate into 150 g. of water was added and were agitated to separate a polymer. Thus separated polymer was taken out and pressed under a pressure of 5 kg./cm.$^2$ for 3 minutes thereby to obtain a solid polymer having a water content of 52%. The resulting solid polymer was further dried by the similar drying operation as in that (d) of Example 1 thereby to obtain a solid Mannich polyacrylamide having a water content of 9.8%. The pulverized Mannich polyacrylamide dissolved perfectly into water and no insoluble substance was contained.

EXAMPLE 4

100 g. of acrylamide was dissolved into 900 g. of demineralized water. Nitrogen was caused to flow through the resulting solution for 15 minutes thereby to remove dissolved oxygen therein and during this through-flow treatment, the temperature of the solution was elevated to 50° C. To thus treated solution, 30 mg. of ammonium persulfate and 15 mg. of sodium hydrogensulfite were added and stirred. After 1 minute, the polymerization initiated and after 4 hours from the initiation of the polymerization, 10% by weight of an aqueous solution of polyacrylamide having an average molecular weight of 3,500,000 was obtained.

800 g. of the resulting polymer aqueous solution was charged into a kneading machine provided with a jacket having a volume of 2 litres. Further, 400 g. of water and a solution consisting of 73 g. of 37% formaldehyde and 117 g. of 40% dimethylamine aqueous solution which where previously mixed and cooled were added to the polymer aqueous solution and were agitated. Thus obtained mixture was subjected to reaction for 4 hours while maintaining a temperature at 35°–40° C. by causing to flow a warmed water through the jacket. As a result, 8.2% by weight of a solution of the Mannich polyacrylamide in which 62% of amide group was aminomethylated. In this case, the degree of the aminomethylation was measured by the colloidal titration of Example 1.

Then, 450 g. of crystal ammonium sulfate was added to the Mannich polymer aqueous solution and were agitated and mixed thereby to separate a polymer. Thus separated polymer was taken out and pressed under a pressure of 5 kg./cm.$^2$ for 3 minutes, whereby a solid polymer having a water content of 50% was obtained.

With respect to 1 part of the solid polymer, 15 parts of acetone was employed to effect dehydration with solvent, and as a result, a solid Mannich polyacrylamide having a water content of 12% was obtained. This solid Mannich polyacrylamide was easily pulverized by a powdering machine, the resulting powder dissolved perfectly in water and no insoluble substance was included therein.

EXAMPLE 5

Into a reactor equipped with a stirrer, thermometer, and inlet for introducing nitrogen, 900 g. of demineralized water, 70 g. of acrylamide, and 30 g. of sulfate of diethylaminoethylene methacrylate were charged. Nitrogen was caused to flow through the resulting solution to remove dissolved oxygen therein. Then, 0.1 g. of potassium persulfate and 0.05 g. of sodium hydrogen-sulfite were added to the solution while maintaining them at a temperature of 50° C. and agitating slowly the solution. After several minutes, the polymerization was initiated and after 4 hours from the initiation of the polymerization, an acrylamide-diethylaminoethylene methacrylate sulfate copolymer having a viscosity of 15,000 cp. at a temperature of 25° C. was obtained. A mixture consisting of 80 g. of 37% formaldehyde and 133 g. of 40% dimethylamine aqueous solution which were previously mixed and cooled was added together with 400 g. of water to the above described copolymer aqueous solution. The resulting mixture was subjected to Mannich reaction by maintaining it for 4 hours at a temperature of 35°–40° C. while agitating the mixture.

Then, 250 g. of powdery potassium carbonate was added to the Mannich reaction product, and were mixed and stirred thereby to separate a polymer. Thus separated polymer was pressed by an oil press under a pressure of 5 kg./cm.$^2$ for 3 minutes. As a result, a solid polymer having a water content of 47% was obtained. Furthermore, the resulting solid polymer was dried by the similar drying operation as in that (d) of Example 1 thereby to obtain a solid Mannich polymer having a water content of 8%. The pulverized Mannich polymer dissolved perfectly into water and no insoluble substance was contained.

EXAMPLE 6

1 kg. of 10% by weight of the polyacrylamide aqueous solution prepared by the process (a) of Example 1 was charged into a kneading machine provided with a jacket having a volume of 2 litres. Further, 400 g. of water and a solution consisting of 34 g. of 37% formaldehyde and 52 g. of 40% dimethylamine aqueous solution which were previously mixed and cooled were added to the polyacrylamide aqueous solution. Under the agitation of the mixture, which was subjected to Mannich reaction while maintaining a temperature of the mixture at 35°–40° C. by causing to flow a warmed water through the jacket for 4 hours.

As a result of colloidal titration of the resulting Mannich polyacrylamide, it was observed that 24% of amide group of the polyacrylamide was aminomethylated.

Then, 230 g. of powdery disodium hydrogenphosphate was added to the Mannich polymer aqueous solution, and were blended and stirred thereby to separate a polymer. Thus separated polymer was taken out and pressed by an oil press under a pressure of 5 kg./cm.$^2$ for 3 minutes. As a result, a solid polymer having a water content of 58% was obtained. Furthermore, the resulting solid polymer was dried by the similar drying operation as in that (d) of Example 1 thereby to obtain a solid Mannich polymer having a water content of 12%. The pulverized Mannich polymer dissolved perfectly into water and no insoluble substance was contained.

REFERENCE EXAMPLE

The comparison of flocculating effects between the powdery acrylamide polymers prepared by the process of the present invention and aqueous acrylamide polymer solution prior to adding the salts was carried out.

Sample: White in the paper making (pH 4.8; concentration of suspended solid (SS) 258 p.p.m.; and main constituent of suspended solid being fine pulp and clay)

Tipe for flocculating test: Jar tester

Condition of agitation: 120 r.p.m. for 1 min., 70 r.p.m. for 2 min., and 35 r.p.m. for 3 min Flocculant: (1) aminomethylated polyacrylamide aqueous solution prepared by the Mannich reaction (b) of Example 1 and having 9.56% of the concentration of effective component. (2) Powdery polyacrylamide aminomethylated compound obtained by the drying operation (d) of Example 1.

Measuring method: A flocculant was prepared in the form of a diluted aqueous solution having 0.1% by weight of a polymer concentration, a suitable amount thereof was added to 500 ml. of the white water charged into a beaker having a volume of 500 ml. and were agitated. Then, the agitation was stopped, and the sedimentation velocity of thus formed floc and the suspended solid concentration of the resulting supernatant liquid were measured respectively.

RESULT

| Flocculant | Addition rate of effective component, p.p.m. | Sedimentation velocity, cm./min. | Suspended solid concentration of treated water, p.p.m. |
|---|---|---|---|
| Without addition | | | 180 |
| (1) | 1 | 2.3 | 45 |
|  | 2 | 4.4 | 32 |
|  | 3 | 6.2 | 23 |
| (2) | 1 | 2.2 | 46 |
|  | 2 | 4.4 | 32 |
|  | 3 | 6.2 | 22 |

What is claimed is:

1. A process for producing cationic water soluble polymers which comprises the steps of causing formaldehyde and amine to react with an aqueous solution of a water soluble polymer to aminomethylate 5 or more mol percent of the acid amide groups in said polymer thereby to obtain a cation modified polymer aqueous solution, said water soluble polymer having 50 or more mol percent of acid amide groups and being a member selected from the group consisting of homopolymers of acrylamide or methacrylamide, copolymers thereof, and copolymers of acrylamide or methacrylamide and copolymerizable unsaturated monomers selected from the group consisting of acrylic acid, acrylates, acrylic esters, methacrylic acid, methacrylates, methacrylic esters, N-vinylpyrrolidone, acrylonitrile, methacrylonitrile, vinyl acetate, styrene, diethylaminoethylene methacrylate, and N-vinylpyridine, adding a water soluble salt to said cation modified polymer aqueous solution to separate the cationic water soluble polymer, said water soluble salt being selected from the group consisting of salts prepared from a polybasic acid and a metal, monohydrogen salts prepared from a tribasic acid and a metal, salts prepared from a mineral acid of polybasic acid with ammonia, and monohydrogen salts prepared from a mineral acid of a tribasic acid with ammonia, recovering said cationic water soluble polymer from the aqueous solution, and then, subjecting said polymer to dehydration and drying at a temperature of 80° C. or below.

2. A process according to claim 1 in which said copolymerizable monomer is selected from the group consisting of acrylic acid, acrylate, methacrylic acid, methacrylates, N-vinylpyrrolidone, acrylonitrile, methacrylonitrile, vinyl acetate, styrene, diethylaminoethylene methacrylate, and N-vinylpyridine.

3. A process according to claim 1 in which the degree of polymerization of said water soluble polymer is at least 1000.

4. A process according to claim 1 in which said amine is selected from the group consisting of primary and secondary amines having alkanol or alkyl containing from 1 to 3 carbon atoms.

5. A process according to claim 1 in which said water soluble salt is selected from the group consisting of carbonates, sulfates, sulfites, phosphates, metaphosphates, oxalates, and citrates of potassium, sodium, lithium, and magnesium, and salts prepared from ammonia with polybasic mineral acids.

6. A process according to claim 1 in which at least 10% by weight of said water soluble salt is added to said cation modified polymer aqueous solution.

7. A process according to claim 5 in which said water soluble salt is selected from the group consisting of $K_2CO_3$, $Na_2CO_3$, $K_2SO_4$, $Na_2SO_4$, $(NH_4)_2SO_4$, $MgSO_4$, $Na_2SO_3$, $K_2SO_3$, $Na_2S_2O_3$, $Na_2SiO_3$, $K_2HPO_4$, $(NH_4)_2HPO_4$, $K_3PO_4$, $Na_3PO_4$, sodium metaphosphate, potassium oxalate, and sodium citrate.

8. Cationic water soluble polymers produced by the process of claim 1.

References Cited
UNITED STATES PATENTS

| | | | |
|---|---|---|---|
| 2,328,901 | 9/1943 | Grimm et al. | 260—72 |
| 3,323,979 | 6/1967 | Foster et al. | 260—72 X |
| 3,539,535 | 11/1970 | Wisner | 260—72 |

HOWARD E. SCHAIN, Primary Examiner

U.S. Cl. X.R.

260—29.4 UA

UNITED STATES PATENT OFFICE
CERTIFICATE OF CORRECTION

Patent No. 3,790,529         Dated February 5, 1974

Inventor(s) Kinji FUJIMURA ET AL

It is certified that error appears in the above-identified patent and that said Letters Patent are hereby corrected as shown below:

Column 1, in the heading, the claim for priority should appear as follows:

-- Japanese Application No. 43785/71 filed June 18, 1971 --.

Column 4, line 40, "soild" should read -- solid --. Column 5, line 3, "10°" should read -- 10% --; Column 5, line 22, "convenional" should read -- conventional --. Column 7, line 10, "where" should read -- were --. Column 10, line 13, claim 7, after "$K_2HPO_4$" insert -- $Na_2HPO_4$ --.

Signed and sealed this 22nd day of October 1974.

(SEAL)
Attest:

McCOY M. GIBSON JR.
Attesting Officer

C. MARSHALL DANN
Commissioner of Patents